Patented Mar. 11, 1947

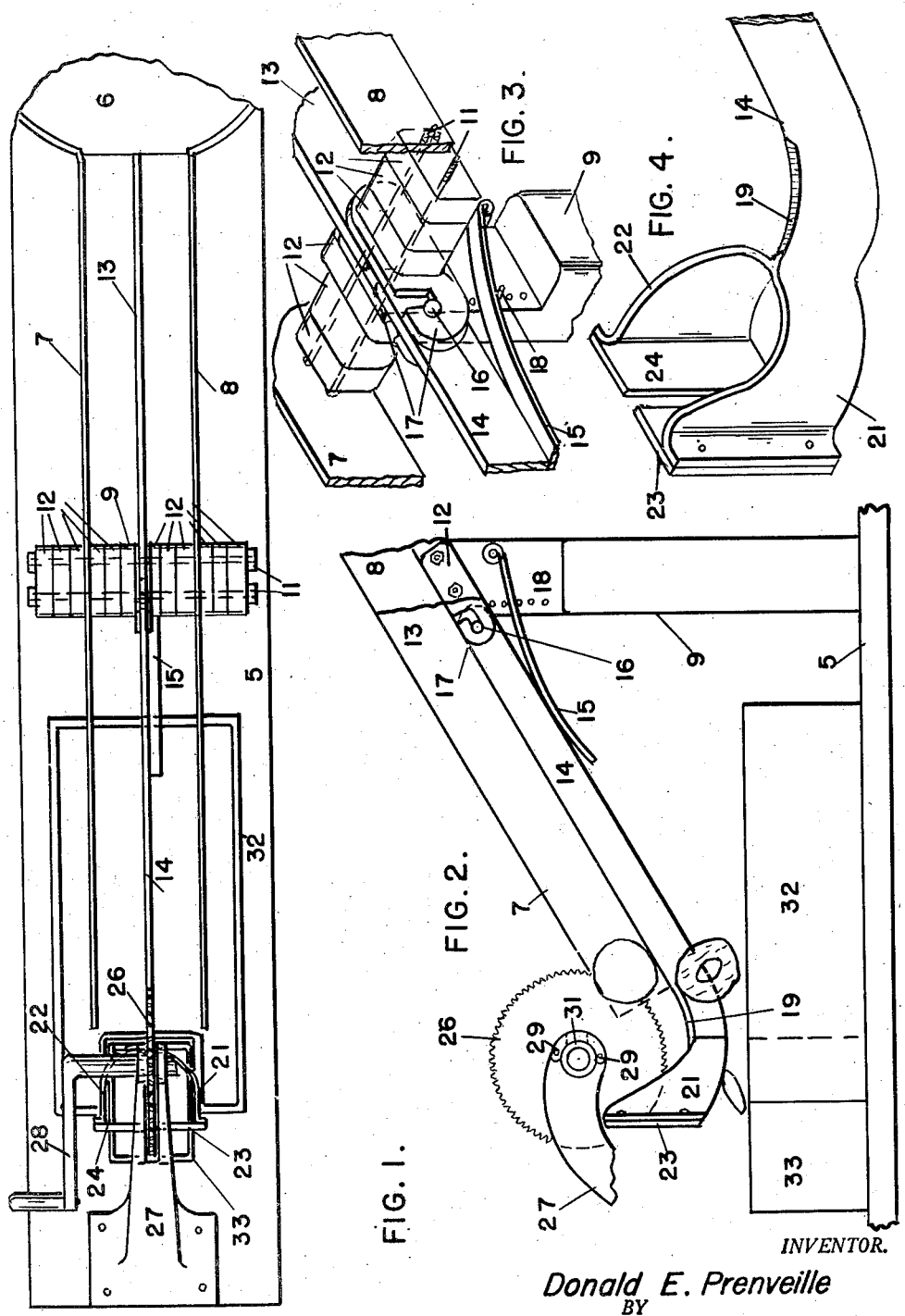
March 11, 1947. D. E. PRENVEILLE 2,417,174
FRUIT SPLITTING AND PITTING DEVICE
Filed May 18, 1945
INVENTOR.
Donald E. Prenveille
BY
ATTY.

2,417,174

UNITED STATES PATENT OFFICE 2,417,174

FRUIT SPLITTING AND PITTING DEVICE

Donald E. Prenveille, Oakland, Calif.

Application May 18, 1945, Serial No. 594,455

2 Claims. (Cl. 146—28)

This invention relates to improvements in splitting and pitting devices and has particular reference to an apparatus for splitting and pitting fruit, such as peaches, apricots, plums and the like, irrespective of diameter.

A further object is to produce a device of this character which is economical to manufacture and one which will be quickly and easily disassembled for the purpose of cleaning.

A still further object is to produce a device which may be operated by unskilled workers, and A further object is to produce a device which may be readily transported from one place to another as conditions may warrant.

Other objects and advantages will be apparent during the course of the following description.

In the accompanying drawings forming a part of this specification and in which like numerals are employed to designate like parts throughout the same, Fig. 1 is a top plan view of my device.

Fig. 2 is a fragmentary side elevation of Fig. 1.

Fig. 3 is a fragmentary detailed perspective view of the hinged rail and its spring mounting, and Fig. 4 is a fragmentary, perspective view of the separating and pitting end of the rail.

In the preparation of fruit, such as peaches and apricots, for drying and canning, it is necessary for operators to tediously cut the fruit in half and then remove the pit or stone therefrom. This work is usually performed by a large number of girls and it is a slow and tedious process, as well as a very messy one, for the reason that the fruit juices coagulate on the hands of the operators, resulting in frequent washing of the hands and thereby slowing up the work.

I have, therefore, devised a mechanism wherein the fruit will be automatically turned into proper position for cutting or splitting, then split and the stone or pit automatically removed therefrom.

In the accompanying drawings wherein for the purpose of illustration is shown a preferred embodiment of my invention, the numeral 5 designates a base, above which is positioned a hopper 6. Extending downwardly from the hopper are a pair of rails 7 and 8, which rails are supported by a standard 9, through which bolts 11 extend and support spacing blocks 12. These spacing blocks permit the rails 7 and 8 to be moved closer together or farther apart as is deemed necessary for the particular size of fruit being operated upon.

It is merely necessary to rearrange the spacing blocks to accomplish the desired result.

A center rail 13 extends downwardly from the hopper and has its lower portion 14 removably pivoted as at 16 to a pair of bayonet-slotted eyes 17, whereby the same may be readily removed, if desired. This lower portion 14 is supported by an adjustable spring 15, upon which it rests, adjustment being made through the medium of a pin 18, adjustable in holes formed in the support 9.

Referring now to Fig. 2, it will be noted that the lower end of this rail is provided with a cutter 19, and with diverging portions 21 and 22, thus forming a bifurcated end, the purpose of which will be later seen.

Secured to the diverging ends 21 and 22 are scrapers, as shown at 23 and 24 respectively, which scrapers are adapted to lie on opposite sides of a rotatable cutter 26, which cutter is mounted upon a standard 27 and rotated through the medium of a crank 28.

The cutter 26 may be quickly removed from the standard 27, by removing pins 29 and a bearing-plate 31.

Mounted on the base 5 is a fruit receiving receptacle 32 and a pit-receiving receptacle 33. The result of this construction is that when fruit is placed in the hopper it will roll down the rail 13, between the guides 7 and 8, which have been adjusted to the proper width for the average size of fruit being processed, and due to a certain characteristic of most fruit, the cleavage in the fruit will line up with the rail 13 after the fruit has rolled a very short distance, or if the fruit is that kind which does not have a cleavage-line, then it will line up so that the ends of the fruit are toward the guides.

As the fruit continues down, it will pass onto the pivoted portion 14 of the rail and come into contact with the rotating splitting element, or saw 26, which will further rotate the fruit, at the same time splitting it and forcing it downward onto the knife 19. This will cause a separating of the two halves, which will fall into the receptacle 32. The pit will be carried on by the action of the saw and deposited through and between the ends 21 and 22.

Should the pit be of greater size than the distance between the saw and the knife-edge, the whole rail 14 will be moved downwardly about its pivot and against the tension of the spring 17. The pit will fall into the receptacle 33.

It will thus be seen that my device will perform all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a splitting and pitting device a rail down which fruit to be split and pitted rolls, adjustable guides spaced on each side of said rail, a rotatable splitting saw mounted adjacent the end of said rail and spaced thereabove, the end of said rail adjacent said saw being bifurcated and extending on opposite sides of said saw and to a point above the bottom of said saw, the lower end of said inclined rail and its bifurcated end being flexibly connected to the upper end of said inclined rail, whereby said bifurcated end may move toward and away from said saw to accommodate fruit of various sizes.

2. In a splitting and pitting device, a rail down which fruit to be split and pitted rolls, adjustable guides spaced on each side of said rail, a rotatable splitting saw mounted adjacent the end of said rail and spaced thereabove, the end of said rail adjacent said saw being bifurcated and extending on opposite sides of said saw and to a point above the bottom of said saw, the lower end of said inclined rail and its bifurcated end being flexibly connected to the upper end of said inclined rail, whereby said bifurcated end may move toward and away from said saw to accommodate fruit of various sizes, and spring means supporting said flexible rail portion.

DONALD E. PRENVEILLE.

REFERENCES CITED

The following references are of record in the file of this patent:

UNITED STATES PATENTS

| Number | Name | Date |
| --- | --- | --- |
| 404,517 | Briggs et al. | June 4, 1889 |
| 1,329,755 | Dunkley | Feb. 3, 1920 |
| 789,898 | Briggs | May 16, 1905 |
| 786,482 | Caldwell | Apr. 4, 1905 |
| 569,838 | Rehm | Oct. 20, 1896 |
| 1,357,004 | Robbins | Oct. 26, 1920 |